US007171389B2

(12) United States Patent
Harrison

(10) Patent No.: US 7,171,389 B2
(45) Date of Patent: Jan. 30, 2007

(54) IDENTIFICATION, STORAGE AND DISPLAY OF LAND DATA ON A WEBSITE

(75) Inventor: Craig Harrison, Fort Collins, CO (US)

(73) Assignee: Landnet Corporation, Fort Collins, CO (US)

( * ) Notice: Subject to any disclaimer, the term of this patent is extended or adjusted under 35 U.S.C. 154(b) by 530 days.

(21) Appl. No.: 10/162,723

(22) Filed: Jun. 3, 2002

(65) Prior Publication Data

US 2002/0198736 A1    Dec. 26, 2002

Related U.S. Application Data

(60) Provisional application No. 60/370,083, filed on Apr. 4, 2002, provisional application No. 60/356,405, filed on Feb. 11, 2002, provisional application No. 60/336,258, filed on Oct. 31, 2001, provisional application No. 60/295,097, filed on Jun. 1, 2001.

(51) Int. Cl.
G06Q 99/00 (2006.01)
H04K 1/00 (2006.01)
H04L 9/00 (2006.01)

(52) U.S. Cl. .............................. 705/51; 705/52; 705/53; 705/54; 705/55; 705/56; 705/57; 705/58; 705/59; 705/1; 705/10; 705/27; 705/26; 701/213; 701/208; 701/207; 340/990

(58) Field of Classification Search ............ 705/50–59, 705/1; 701/213, 208, 207; 340/990
See application file for complete search history.

(56) References Cited

U.S. PATENT DOCUMENTS 4,661,811 A * 4/1987 Gray et al. ................. 345/636

(Continued)

OTHER PUBLICATIONS www.landviewer.com.*

(Continued)

Primary Examiner—Andrew J. Fischer
Assistant Examiner—Cristina Owen Sherr
(74) Attorney, Agent, or Firm—William W. Cochran; Cochran Freund & Young LLC

(57) ABSTRACT

Disclosed is a land website that provides a personalized database on which data can be stored, retrieved, customized and communicated (e.g., by e-mail) relating to a particular piece of property. The database can be accessible via a password and a security code over the Internet and may be encrypted for transmission. Land websites can be established that contain image data, map libraries, virtual tours, legal descriptions, title information, e-documents, actual pictures of property and various other information. Unique 3-D imaging of composite images can be provided on the land website as well as fly-around composite 3-D images. The land website provides a unique way of packaging information relating to a piece of land in a single, accessible location. A boundary applet tool is provided on the land website portal that allows a user to simply and easily draw boundaries around the property of interest and then submit an order for more detailed information about the property of interest. Various map data and image data are provided to assist the user in drawing the boundaries. Acreage amounts are automatically calculated based upon the size and area drawn by the user. Properties of interest can be easily accessed by a global coordinate system or by searching on map data that is provided on a wide range of scales.

26 Claims, 12 Drawing Sheets

U.S. PATENT DOCUMENTS

| | | | | |
|---|---|---|---|---|
| 4,870,576 A | * | 9/1989 | Tornetta | 705/1 |
| 4,873,513 A | * | 10/1989 | Soults et al. | 345/27 |
| 5,032,989 A | * | 7/1991 | Tornetta | 705/1 |
| 5,359,526 A | * | 10/1994 | Whittington et al. | 701/200 |
| 5,414,462 A | * | 5/1995 | Veatch | 348/135 |
| 5,418,906 A | * | 5/1995 | Berger et al. | 702/5 |
| 5,422,814 A | * | 6/1995 | Sprague et al. | 701/213 |
| 5,544,052 A | * | 8/1996 | Fujita et al. | 702/5 |
| 5,664,115 A | * | 9/1997 | Fraser | 705/37 |
| 5,680,305 A | * | 10/1997 | Apgar, IV | 705/10 |
| 5,736,977 A | * | 4/1998 | Hughes | 715/716 |
| 5,751,612 A | * | 5/1998 | Donovan et al. | 703/6 |
| 5,781,773 A | * | 7/1998 | Vanderpool et al. | 707/100 |
| 5,794,216 A | * | 8/1998 | Brown | 705/27 |
| 5,852,810 A | * | 12/1998 | Sotiroff et al. | 705/27 |
| 5,978,747 A | * | 11/1999 | Craport et al. | 702/150 |
| 6,085,135 A | * | 7/2000 | Steckel | 701/50 |
| 6,121,970 A | | 9/2000 | Guedilia | |
| 6,218,965 B1 | * | 4/2001 | Gendron et al. | 701/208 |
| 6,229,546 B1 | * | 5/2001 | Lancaster et al. | 345/419 |
| 6,236,907 B1 | * | 5/2001 | Hauwiller et al. | 700/283 |
| 6,247,019 B1 | * | 6/2001 | Davies | 707/103 R |
| 6,263,343 B1 | * | 7/2001 | Hirono | 707/104.1 |
| 6,307,573 B1 | * | 10/2001 | Barros | 705/26 |
| 6,314,370 B1 | * | 11/2001 | Curtright | 701/213 |
| 6,320,599 B1 | | 11/2001 | Sciammarella et al. | |
| 6,321,158 B1 | * | 11/2001 | DeLorme et al. | 701/201 |
| 6,336,074 B1 | * | 1/2002 | Woo | 701/208 |
| 6,356,283 B1 | * | 3/2002 | Guedalia | 715/760 |
| 6,366,294 B1 | | 4/2002 | Cunningham | |
| 6,397,144 B2 | * | 5/2002 | Ikeuchi et al. | 701/208 |
| 6,421,610 B1 | * | 7/2002 | Carroll et al. | 702/5 |
| 6,434,258 B2 | * | 8/2002 | Wiens | 382/113 |
| 6,442,483 B1 | * | 8/2002 | Doglione | 701/300 |
| 6,493,633 B2 | * | 12/2002 | Baron et al. | 702/3 |
| 6,834,252 B2 | * | 12/2004 | Yokota | 705/7 |
| 7,054,741 B2 | * | 5/2006 | Harrison et al. | 701/208 |
| 2001/0026271 A1 | | 10/2001 | Higgins et al. | |
| 2002/0000999 A1 | | 1/2002 | McCarty | |
| 2002/0060734 A1 | | 5/2002 | Hino | |
| 2002/0067353 A1 | | 6/2002 | Kenyon et al. | |
| 2002/0067374 A1 | | 6/2002 | Kenyon | |
| 2002/0067379 A1 | | 6/2002 | Kenyon | |
| 2002/0072850 A1 | | 6/2002 | McClure | |
| 2002/0076323 A1 | | 6/2002 | O'Dell | |
| 2002/0091768 A1 | | 7/2002 | Singh et al. | |
| 2002/0122564 A1 | | 9/2002 | Rhoads et al. | |
| 2003/0220734 A1 | * | 11/2003 | Harrison et al. | 701/208 |

OTHER PUBLICATIONS www.mapquest.com.*
www.globeexplorer.com.*
www.pixxures.com.*
www.terraserver.com.*
U.S. Appl. No. 10/365,718, filed Feb. 11, 2003 Harrison et al.
U.S. Appl. No. 10/408,757, filed Mar. 3, 2002 Harrison.

* cited by examiner

IDENTIFICATION, STORAGE AND DISPLAY OF LAND DATA ON A WEBSITE

CROSS-REFERENCE TO RELATED APPLICATIONS

This application is based upon and claims priority to U.S. provisional application Ser. No. 60/295,097, filed Jun. 1, 2001 entitled "Identification, Storage and Display of Land Data on a Website"; U.S. provisional application 60/336,258, filed Oct. 31, 2001 entitled "Identification, Storage and Display of Land Data on a Website"; U.S. provisional application Ser. No. 60/370,083, filed Apr. 4, 2002, entitled "Web Imaging Serving Technology"; and U.S. provisional application Ser. No. 60/356,405, filed Feb. 11, 2002, entitled "Internet Delivered and Accessible Set of Maps, Images, and Tools for Locating, Identifying, Measuring, Viewing, and Communicating Information About Land and Areas of Land".

BACKGROUND OF THE INVENTION a. Field of the Invention

The present invention generally pertains to imaging and more particularly to archiving and accessing land image data on a land website.

b. Description of the Background

An extensive amount of data has been collected from various sources such as satellites, land surveys, legal descriptions and other sources that provide detailed information relating to land. For example, maps provided by the Bureau of Land Management provide map data that indicates legal boundaries relating to land ownership. Satellite data provides imagery indicating land features, growth and vegetation, water sources and other geographical features. Infrared imagery has been used to careful study growth and vegetation features, for example. Topological information has been accumulated through radar satellites and topological surveys. Hence, there is a huge body of information relating to land and associated features such as rivers, roads, vector data and raster data.

Various imaging techniques have been used that combine various sources of data and allow a user to view images of these combined data sources. For example, 3-D images have been generated that combine political and physical characteristics with satellite imagery. Land can be viewed, using this technique, at an elevated angle such that the image depicts the various features relating to land. Further, growth and vegetation data can be added to such images from other data sources to provide a more enhanced view. As another example, BLM map data can be combined with satellite imagery data to indicate legal boundaries on the satellite imagery. Further, topological data can be used to provide shading on a two-dimensional image that provides imagery relating to topological features which is commonly referred to as 2.5-D images.

Although various imaging techniques have been used to combine various sources of land data, these imaging techniques have not been effectively used in identifying property boundaries and effectively generating various images of an identified piece of property that illustrates property boundaries and can be used and implemented in a simple and easy fashion for various purposes. Further, a central archive of data and images of a property of interest that is easily accessible by the Internet has not heretofore been available.

Hence, it would be desirable to provide a system that allows users to identify property and provide images and related data regarding that property in a simple and easy fashion that can be easily accessed archived and retrieved (both openly and via password) for various purposes.

SUMMARY OF THE INVENTION

The present invention overcomes the disadvantages and limitations of the prior art by providing a system that provides a central archive for storing map data, satellite images, e-documents, photographs, modified images, important Internet links, and any other desired data relating to a property. The system of the present invention generates a partitioned storage area on an Internet server for each property that is either publicly accessible, or password and security code accessible, so as to provide a personalized, customizable land website. Because every parcel of land is unique, the personalized land website provides a digital "fingerprint" of the property.

The present invention can employ various techniques for locating and identifying a property of interest. For example, the system of the present invention may allow a user to visually identify a property by using various map data or images of land. A drawing tool can be employed by the user to generate boundaries that circumscribe the property. The circumscribed property is then framed within a boundary window so that additional imagery can be generated that allows the user to view various images of the circumscribed property within the boundary frame window ("frame window"). Viewers can then take virtual tours of the property by simply using an Internet accessible computer having a web browser. For example, rotating 3-D imagery of the property within the frame window can be generated such that the property can be viewed at an elevated angle showing topological features, vegetation and growth, legal boundaries and other information from 360 degrees. Global coordinates from one set of map data to another set can be used so that boundary points identified on one set of images appears on other sets of image data at corresponding locations to assist the user in properly identifying the property boundaries of interest.

The present invention may be used for various purposes to archive and deliver land information to various people such as brokers, appraisers, lenders, developers, land owners, consultants, potential buyers, construction personnel making improvements on the property, government personnel making planning decisions, land managers, etc. In each of these cases, other additional data from the user or third parties can be provided on the land website. For example, legal documents can be provided relating to the land. In that regard, terms of the purchase can be provided together with leases, title abstracts, easements, rights of way and other legal documentation in a specific area set aside for e-documents. Additionally, the present invention can be implemented in a simple and easy fashion over the Internet which will allow users to readily access data for generating circumscribed boundaries and frame windows for viewing the property.

The present invention may therefore comprise a method of generating a personalized land website that provides information relating to an area of land, the personalized land website providing a dedicated Internet accessible location that provides an archive of information, comprising: providing map image data over the Internet that is accessible to a creator that desires to generate the land website; providing boundary drawing tools to the user to allow the creator to circumscribe a boundary around the area of land on the map image data; determining global coordinates of the boundary;

generating additional map image data and other image data located within and around the boundary; storing the map image data, additional map image data and other image data in storage locations on the land website that are accessible to users of the personalized land website; providing additional storage locations on the personalized land website that are accessible to the users to allow storage of text information relating to the area of land.

The present invention may further comprise a method of generating a personalized land website that contains information relating to an area of land at a single location that is accessible on the Internet comprising: providing map image data over the Internet that is accessible to a creator that desires to generate personalized land websites; providing boundary drawing tools to the creator to allow the creator to circumscribe a boundary around the area of land; generating a frame window around the boundary; determining global coordinates of the frame window; providing additional map image data and other image data located within the global coordinates of the frame window; storing the map image data, additional map image data and other image data in storage areas on the personalized land website; protecting the storage areas and additional storage areas with at least one security code.

The present invention may further comprise a land website that allows a creator to generate a personalized land website, the personalized land website providing a dedicated Internet accessible location for archiving information relating to an area of land comprising: a storage device that stores map image data that is accessible to a creator of the personalized land website; boundary drawing tools that allow the creator to circumscribe as boundary around the area of land using the map image data and other image data; a frame window generator that generates a frame window around the area of land by identifying global coordinates on the map image data and other image data that identify map image data and other image data to be stored on the personalized land website; an Internet accessible storage area on the land website having an Internet address that stores the map image data and other image data as a personalized land website for access by users; browser compatible imaging tools that interface with browsers utilized by the users to allow users to view the map image data and other image data.

The advantages of the present invention are that digital images including map data can be provided in a simple and easy fashion over the Internet that allows users to circumscribe the boundaries of a piece of property of interest. A unique personalized, customizable website for the property of interest (land website) can then be established that allows viewers having a password to view the property and related information relating to the property. Various image data can be viewed in various desired combinations that allows a viewer to take virtual tours of property over the Internet by accessing land websites of ranches, farms, land areas of interest and other large properties in an affordable manner. Updates can be easily made to the land website. Purchase of new information that has become available such as flood plain data, new maps, etc. can be made by a user in response to e-mail notifications.

When using the present invention for land marketing purposes, the time between listing and closing on the sale of the property can be reduced by having a land specific website that allows users to take virtual tours. For example, research time is reduced because paper maps that cover the appropriate area do not have to be located and purchased. The land website and virtual tours that are established in accordance with the present invention do not require technical skills of the user to establish a land website. For example, a landowner who wishes to use this service can easily do so by circumscribing that property using a simple boundary generation software drawing tool that may be provided over the Internet with the map image data. The system, in accordance with the present invention, is intuitive and easy to use. One of the features of the present invention that aids the user in establishing a boundary is the establishment of georeferenced points on a plurality of different types of maps that cross-link information from one map to another to aid the user in identifying boundary points. The land website can be made publicly available for marketing purposes.

Further, the present invention does not require the user to obtain special software. Commonly available web browser software such as Internet Explorer, Netscape, etc. can be used to access the land specific websites. Graphics packages such as Microsoft Paint, Adobe Photoshop and other commonly used image modifying software are also readily available which allow a user to generate modified image data. The present invention also has the convenience of being available to any computer having Internet access, at any time, from any location.

A further advantage of the present invention is that information relating to the property can be located in one convenient place, i.e. the land website. Customization modules allow users to add scanned and text documents, appraisals, reports, loan documents, photographs, third party maps and other information relating to the property. For example, using a customization module, which may part of an upgrade package, a user can change the web page style. If the user is attempting to sell a cattle ranch, the web page may display cattle and cowboys. If the property is somewhat mountainous with streams, the user may wish to have a web page that shows fly fishing. Further, a customization module may allow the user to upload photos to a photo gallery that is part of the web page. Also, the customization module may have a location for storing e-documents. For example, PDF documents relating to legal descriptions, easements, watershed studies, forestation, etc. may be scanned and stored in the e-document section. The e-document section may have multiple passwords for limited access. The documents can be stored in any desired format such as PDF format, Word, WordPerfect, jpeg images, etc. The customization module may also allow the user to add links to other locations. For example, if a question arises regarding a particular easement or right of way, a link to a particular treatise on easements and rights of way may be established by the user through the land library. Further, the customization module may allow the user to modify standard images such as jpeg images using available graphics software packages such as Microsoft Paint, and reload those modified images onto the website. Further, the customization model may allow the user to load third party maps onto the land website. Other information such as ideas, directions to the property, etc. can also be stored on the land website.

A further advantage of the present invention is the ability to provide a comprehensive system of storing map data and other data in a simple and easy fashion. For example, a specific implementation of the present invention will allow up to 35 different maps of the property to be stored in a single accessible location including 3-D satellite photography, general vicinity maps, regional and statewide maps and photography, 1:24 K USGS maps, quad maps, 1:100 K quad maps, 1:250 K USGS maps, BLM maps, 2.50 D maps (e.g. color variations to show elevation differences), 3D maps, and/or any other types of maps, in a single accessible location. The user can easily customize any of these maps that are presented as image data using standard graphic software. In addition, modified satellite imagery provided in accordance with the present invention allows an elevated 360 degree fly-around view of the subject property showing topological features and boundaries of the property.

Another advantage of the present invention is that the boundary information can be cross-linked to satellite imagery in the same manner that various types of maps such as USGS, BLM and other types of maps are crossed linked. In this fashion, a particular location or land mass can be positively identified on any desired type of map such as a BLM map, USGS map or other type of map and the corresponding satellite imagery can be displayed with the boundary information by georeferencing the boundary information to global coordinates on the satellite image data. Typically, it is difficult to identify particular locations on satellite imagery because of the lack of political boundaries, legends and other features that are normally shown on typical maps. The georeferencing of global coordinates allows the user to clearly identify specific locations on satellite imagery with an assurance of correctness that has not previously been available, especially for neophyte viewers of satellite data. In this fashion, satellite imagery can now be easily provided through Internet connections that allow the user to view specific areas of interest.

The present invention may also assist brokers in marketing their services. For example, brokers that can offer property for sale using the land websites of the present invention are more likely to obtain sales. Brokers can purchase lower cost implementations to demonstrate the properties and features of the land website to a potential seller to obtain a listing. For example, the present invention may be implemented in a fashion that allows a broker to establish a land website for a particular piece of property that includes only several inexpensive maps. The land website can then be upgraded to provide land virtual tour components such as 3-D maps, fly-around views and other more expensive features after the listing has been obtained. In addition, any particular virtual tour or other image data can be directly e-mailed to potential buyers, brokers, lenders, appraisers and/or engineers and others utilizing the system of the present invention. Also, since the map information is generated as image data, the image data can be used to generate hard copy images such as sales brochures, wall maps and other materials.

The present invention also has the advantage of saving time and minimizing effort in sales activities. For example, buyers can take a virtual tour of the property which may speed the buyer's interest or quickly eliminate uninterested buyers. This may save a considerable amount of time by eliminating physical tours by the broker with uninterested buyers. Instantaneous access and the ability to e-mail image data and virtual tours also saves broker time. Brokers who have individual websites can provide links to the land websites for each of the properties listed by that broker which provides a simple way to concentrate sales of property listed by that broker.

The present invention may also speed the due diligence process of a land buyer. For example, appraisals and loan commitments can be obtained in a much quicker fashion utilizing the present invention. E-mail links can be provided to various information located within the land website which provides all of the base information needed for appraisers and lenders including legal documentation, legal descriptions, printable maps and images, land boundaries, improvements and other information.

The present invention may also be used for purposes other than the sale of real estate, such as management, research, conservation easement creation and maintenance of real estate. Further, the land websites of the present invention can be used for studying property and as a decision making tool. For example, a landowner, manager and consultant of the property can all log onto the land website and make decisions regarding items such as grazing management, fencing and other improvements such as road construction, placement of ponds and lakes, etc. Further, subdivision decisions and other planning decisions can be made using the easily accessible land websites of the present invention. More specifically, map and satellite information is provided as image data, such as jpeg image data, that can be modified by a user and restored on the land website for discussion purposes with land managers, county and state officials, etc. Watershed management, forestation, selective cutting, crop maintenance and other similar uses can be made of the land website of the present invention. The present invention utilizes simple web browser technology and graphic image display software that is commonly available and allows users to modify and enhance images and upload them for functionality and convenient access and retrieval of the land website.

The present invention may also employ a unique marketing approach. In accordance with the marketing approach of the present invention, third party websites relating to land that may have a large amount of traffic are provided with a link button that offers a free map that links directly to the land website of the present invention. The point at which the user is linked to the land website may be an internal point within the land website of the present invention that does not provide overt identification of the land website. The viewer of the third party website can then print a free detailed map of the land or land area of interest that displays the boundaries drawn by the user. As the user proceeds to print a free map, a purchase option is presented to the user to purchase a land website. If a land website is actually purchased by the user, a referral fee can then be paid to the referring website. Traffic can then be driven back to the referring website for other purposes. In this fashion, the link to the land website does not cause traffic to be permanently diverted or lost by the referring website. For example, if a land website is purchased, the traffic may be redirected to the referring website to obtain a loan for the property or place an order to buy future products and services from the referring website. The land website portal may also be accessed by a large tree of domain names that have geographically descriptive terms in combination with generic terms relating to land such as disclosed in U.S. Provisional Patent Application Ser. No. 60/288,815 filed May 4, 2001 entitled "A System for Selling Real Estate Products and Services Through the Internet" by Craig Harrison, which is specifically incorporated herein by reference for all that it discloses and teaches.

The present invention also provides various ways of locating a desired piece of property. In one embodiment, geographic names can be used from the USGS quad maps to narrow in on a desired piece of property. In another embodiment, a search can be performed using township and range identifiers to locate a piece of property within a 6 mile by 6 mile boundary. In a further embodiment, the property can actually be visually located on maps using various maps having different scales to zoom in on the property location.

Further, various techniques can be used for plotting boundaries. For example, points can be visually located on maps and image data to locate boundary points. Further, metes and bounds descriptions can be entered into the system which automatically plot the boundaries using mathematical calculators. As long as the initial point can be located properly, such as through a visual location or other global coordinate system, the metes and bounds description can be plotted using a metes and bounds drawing tool. A third way of plotting boundaries is to use GPS way points that have physically been recorded during a visit to the property. These GPS way points are then loaded into a GPS boundary mapping tool that plots the boundaries on a map that aligns the GPS locations with the proper locations on the map. Boundaries are then formed according to those locations. Alternatively, if the drawing tool is used to generate the boundary data, latitude and longitude coordinates can be recorded as the cursor is moved along the boundary. In this manner, the boundary that is drawn by the user can be recorded using latitudinal and longitudinal data points (boundary data) for comparison with actual property descriptions. In addition, the drawing tool can also provide bearing, distance and direction information as the cursor is moved along the boundary line. In this fashion, the user can plot boundaries by hand using the drawing tool and provide accurate boundaries using metes and bounds descriptions. If a particular metes and bounds description includes a latitude and longitudinal location for any of the corner points, that point can be used as a starting point and located exactly on the map since the map includes the global positioning data. Further, if GPS way points are used, the GPS boundary mapping tool may automatically select the correct size map and satellite resolution to display the property.

DETAILED DESCRIPTION OF THE INVENTION

Figure 1:
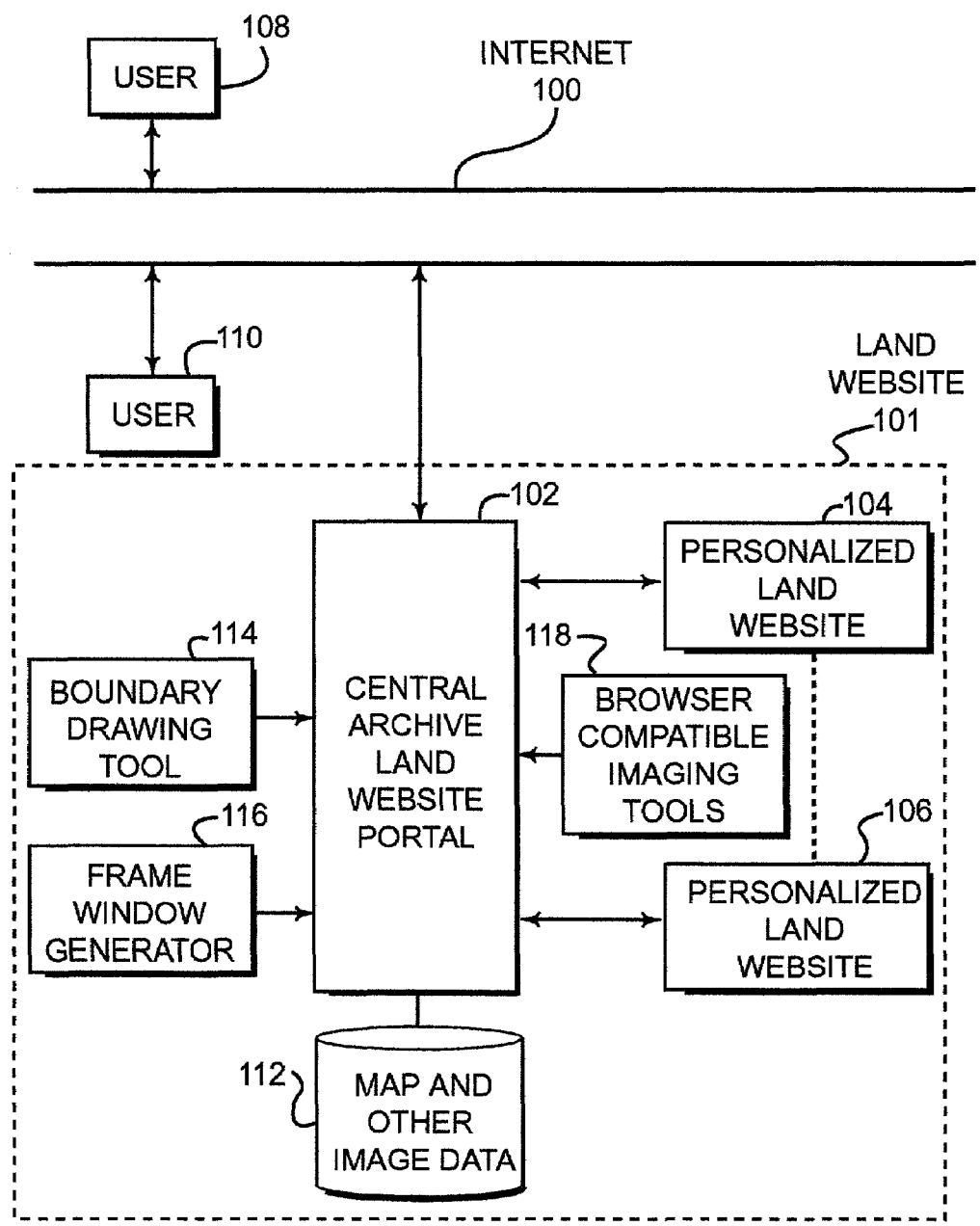
FIG. 1 is a schematic illustration of the manner in which the present invention provides a central archive of personalized land websites.

FIG. 1 is a schematic illustration of one embodiment of the present invention. As shown in FIG. 1, a central archive land website 101 is connected to the Internet that provides interactive connection to the central archive land website 101. The central archive land website 101 is connected to a land website portal 102 that functions as a portal for the land website 102. The land website portal 102 may have a number of personalized land websites 104, 106 that are provided to users via the Internet 100 by a connection through the land website portal 102. The personalized land websites 104, 106 may be generated and paid for by users such as user 108 who is also connected to the Internet 100. The user 108 may select a particular piece of land for which the user would like to establish a personalized land website. As disclosed below, the user 108 generates boundary data to identify the particular piece of property of interest. The land website portal 102 may include a server having a storage device 112 connected thereto having a large amount of storage space. Each personalized land website, such as personalized land websites 104, 106, are stored on the storage device 112 and may then be password and security code protected to restrict access by other users. Further, portions of the personalized land websites may also be protected by additional passwords. User 108 may allow other users such as user 110 to directly access a personalized land website. Alternatively, user 108 may wish to e-mail portions of the data stored on a personalized land website to a user such as user 110. In that regard, the Internet address of the personalized land website may be e-mailed to a user, together with the security code for accessing the personalized land website. The personalized land websites, such as personalized land website 104, 106, may contain various data including various map data illustrating the boundaries of the property, satellite image data, photographic data, e-documents (text material) relating to the property such as grazing leases, title and deed information, public land leases, easements and rights-of-way and other similar e-document information. Photographic data can be scanned as well as e-document data and uploaded by the user onto the personalized land website, as disclosed more fully below. Third party maps can be stored by the user on the personalized land website, as well as image data that has been modified by the user. In short, any type of information relating to the land can be stored by the user on the personalized land website. Further, the personalized land website can be directed to any property of interest and does not have to be owned by the user that establishes the personalized land website. The personalized land website can be used for studying property, offering property for sale, marketing and other various purposes. In this fashion, the present invention provides a central archive of all of the digital information relating to a selected piece of property on a personalized land website that can be archived and retrievable on a site specific basis. In this fashion, a digital fingerprint of the property can be generated.

Map image data and other image data is stored on a storage device 112 coupled to the central archive land website portal 102. The browser compatible imaging tools 118 allow a user such as users 108, 110 to access and view the map and other image data using a standard web browser tool. The users can then utilize the boundary drawing tool 114 to draw a boundary around an area of land of interest. The boundary drawing tool identifies the global coordinates on the map and other image data. These global coordinates are then used by the frame window generator 116 to generate a frame window described below. The map image data and other image data identified in the frame window is then stored in the personalized land website.

Figure 2:
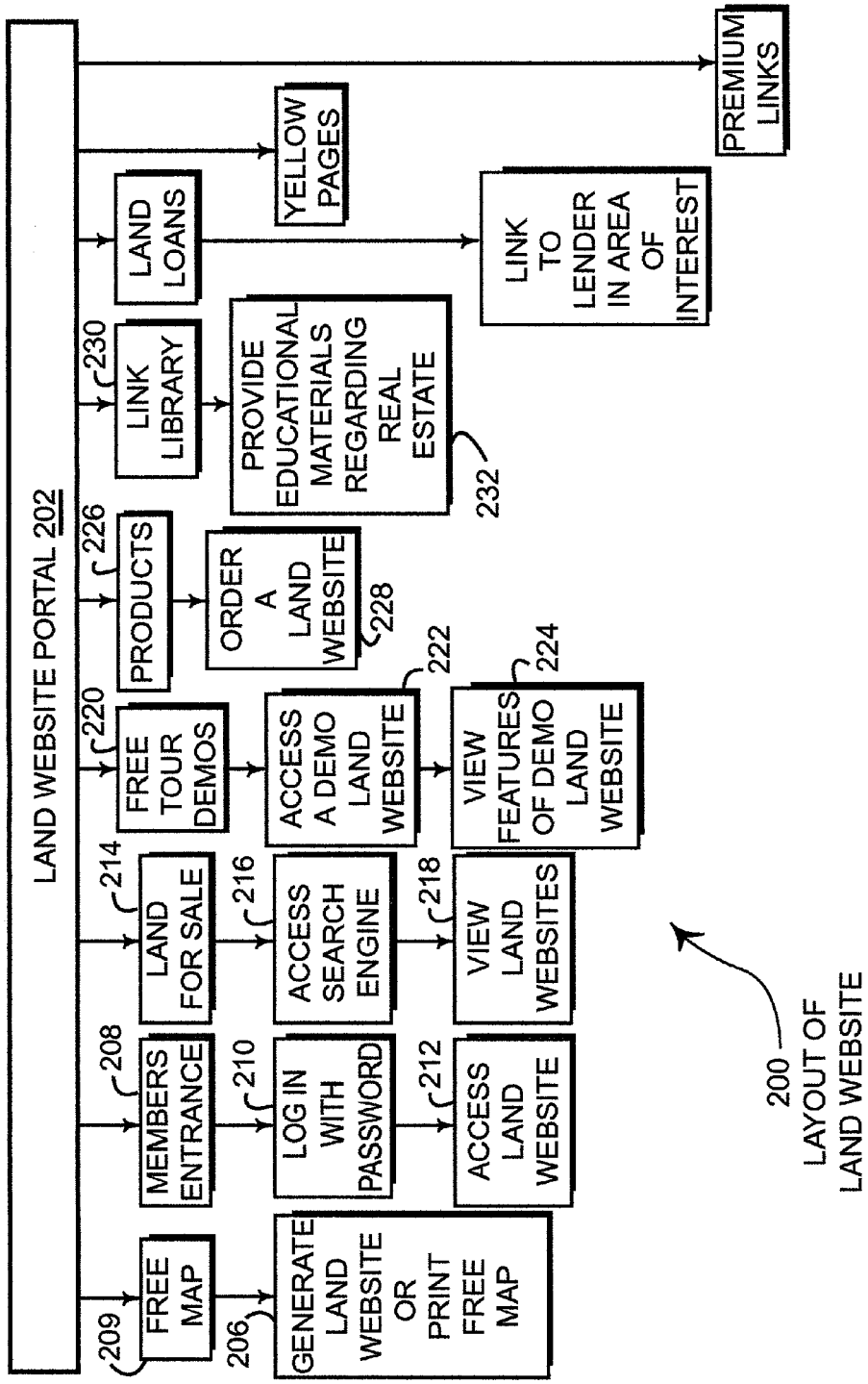
FIG. 2 is a diagram illustrating the layout of the land website portal.

FIG. 2 illustrates the layout 200 of the land website which is operated by a server that is capable of performing the functions disclosed herein. The layout 200 illustrates the manner in which a user of the website can access the functionality provided by the present invention. As shown in FIG. 2, the user can log onto a land website portal 202 that provides the ability to access various functions. For example, the user can access the free map function 204 and subsequently generate a land website or print a free map at step 206, as disclosed above. The user may access the members' entrance 208, login a password at 210, and then access a land website at 212. The user may wish to view land for sale by accessing the land-for-sale button 214. A search engine is then provided at 216. The user can then view various land websites at step 218.

At 220 of FIG. 2, a viewer may wish to view the functionality provided by the land website by viewing free tour demonstrations for sample properties. At step 222, the viewer accesses a demonstration of a land website that may provide a high degree of functionality including 3-D, composite images that contain satellite, vegetation and USGS detail, a fly-around movie that has been generated from composite images, pictures of the property that have been downloaded onto the website, legal and other documentation that has been stored at the website and other functionality that has been described above. A user may also select the products button 226 on the land website portal 202 which allows the user to directly order a land website, rather than entering through the free map entrance 204. The product entrance 226 may be used, for example, as a direct link from another website which has generated interest via a link from a user who would actually like to purchase a website rather than obtain a free map of the land. The land website portal may also include a link library 230 that allows a user of the land website to access educational materials regarding real estate at step 232. The link library 230 provides an additional reason to access the land website portal and draws additional viewers to the land website portal 202.

Figure 3:
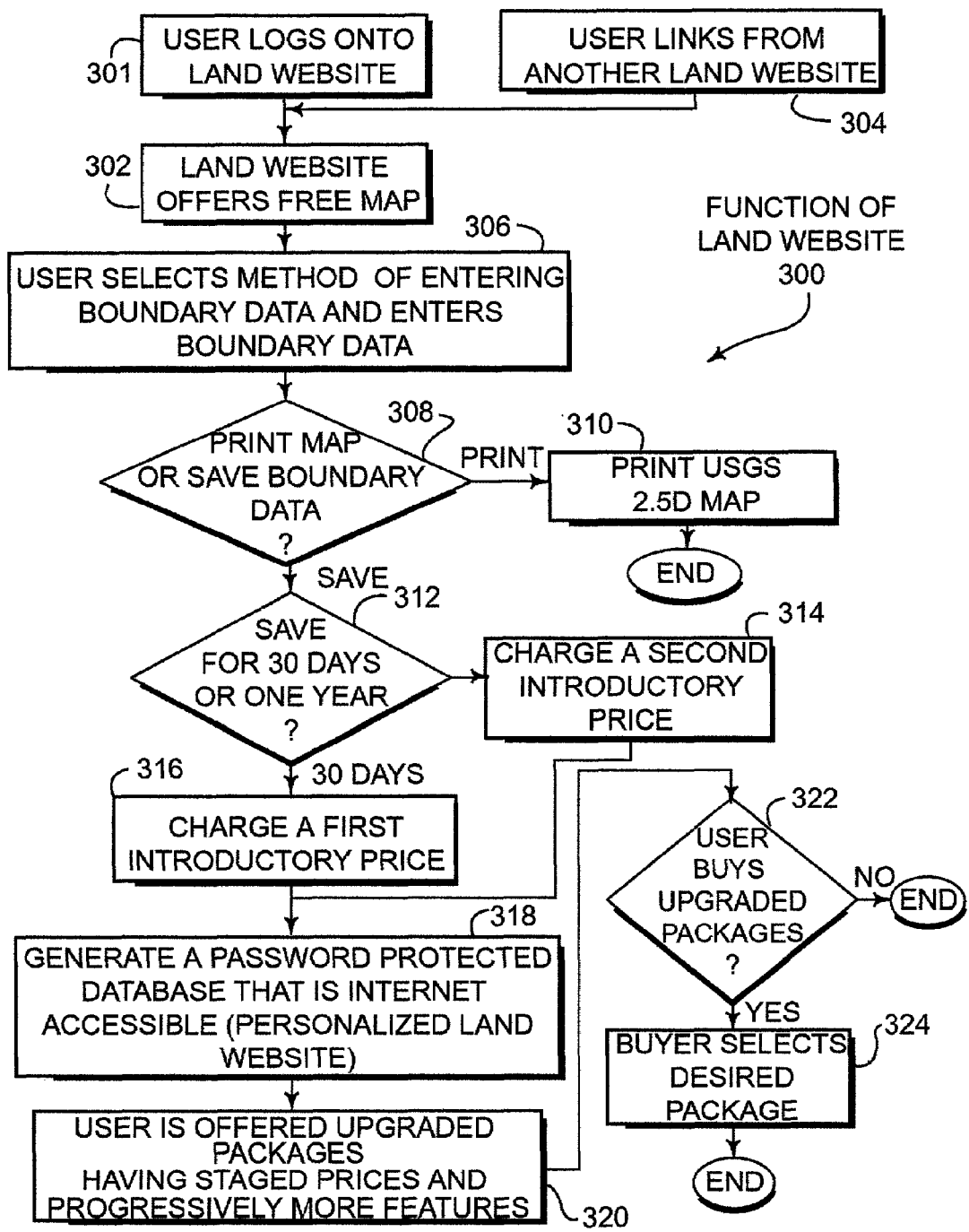
FIG. 3 is a flow diagram illustrating the functions of the land website portal.

FIG. 3 is a flow diagram illustrating the functions of the land website that is used in accordance with the present invention. At step 300 the user logs onto the land website. The land website provides an offer for a free map at step 302. The free map allows the user to draw boundaries and obtain a USGS type of map that can be enhanced by shadowing or colors to indicate terrain variations. The free map can be provided as a 1:24 K USGS map, or a 1:100 K USGS map if the property is very large.

Alternatively, the user can link from another website into the land website, as illustrated at step 304, rather than entering through the splash page of the land website. For example, links may be provided from organizations that study and evaluate property such as environmentalist organizations, the Nature Conservatory, national laboratories, etc. Further, links may be provided from sales organizations such as real estate brokers, online sales organizations, providers of map data, providers of satellite imaging data, etc.

At step 306 of FIG. 3, the user employs a drawing tool to generate boundary data. This step is more fully disclosed with regard to the description of FIG. 5. At step 308, the user is given the choice of printing the map or saving the boundary data. If the user decides to print the map at step 310, an enhanced USGS map having shading to indicate elevation changes (2.5-D map) is provided to the user for printing. More specifically, the land website generates an image of the map data that is downloaded to the user's computer which allows the user to print that image. The image and boundary data that has been generated is then erased from the land website server. The user, in this fashion, receives the free print of the property and the process is ended.

If the user, at step 308, decides to save the boundary data, the user is given the option of saving the boundary data at step 312 for a shorter period, such as 30 days, or a longer period such as 1 year. If the user decides to choose the shorter period, a first introductory price is charged at step 316. The process then proceeds to step 318 where a password protected database that is Internet accessible (personalized land website) is generated. If the user, at step 312, decides to save the data for a longer period, a second introductory price is charged at step 314. The process then proceeds to step 318.

At step 320 of FIG. 3, the user is offered upgraded packages having stage prices and progressively more features. For example, the user may be offered bronze, silver, gold and platinum packages which each contain additional features and have progressively higher prices. For example, the bronze package may include a set of maps that includes BLM data indicating legal boundaries for leased property and acreage calculations. The highest package, the platinum package, may provide 3-D satellite images, a 3-D satellite fly-around movie, storage areas on the personal land website that allow the storage of photographs of the property, a storage area for legal documents relating to the property such as titles, leases, title abstract information, easements, right-of-way information and other features described herein. At step 322, the user is given the choice of purchasing an upgraded package. If the user chooses to not buy an upgraded package, the process ends. If the buyer wishes to buy an upgraded package, at step 324 the buyer selects the desired package and a personalized land website is provided having the features corresponding to the particular package purchased by the user. The user then selects a password and security code that the user can provide to other parties to access the user's land website.

Figure 4:
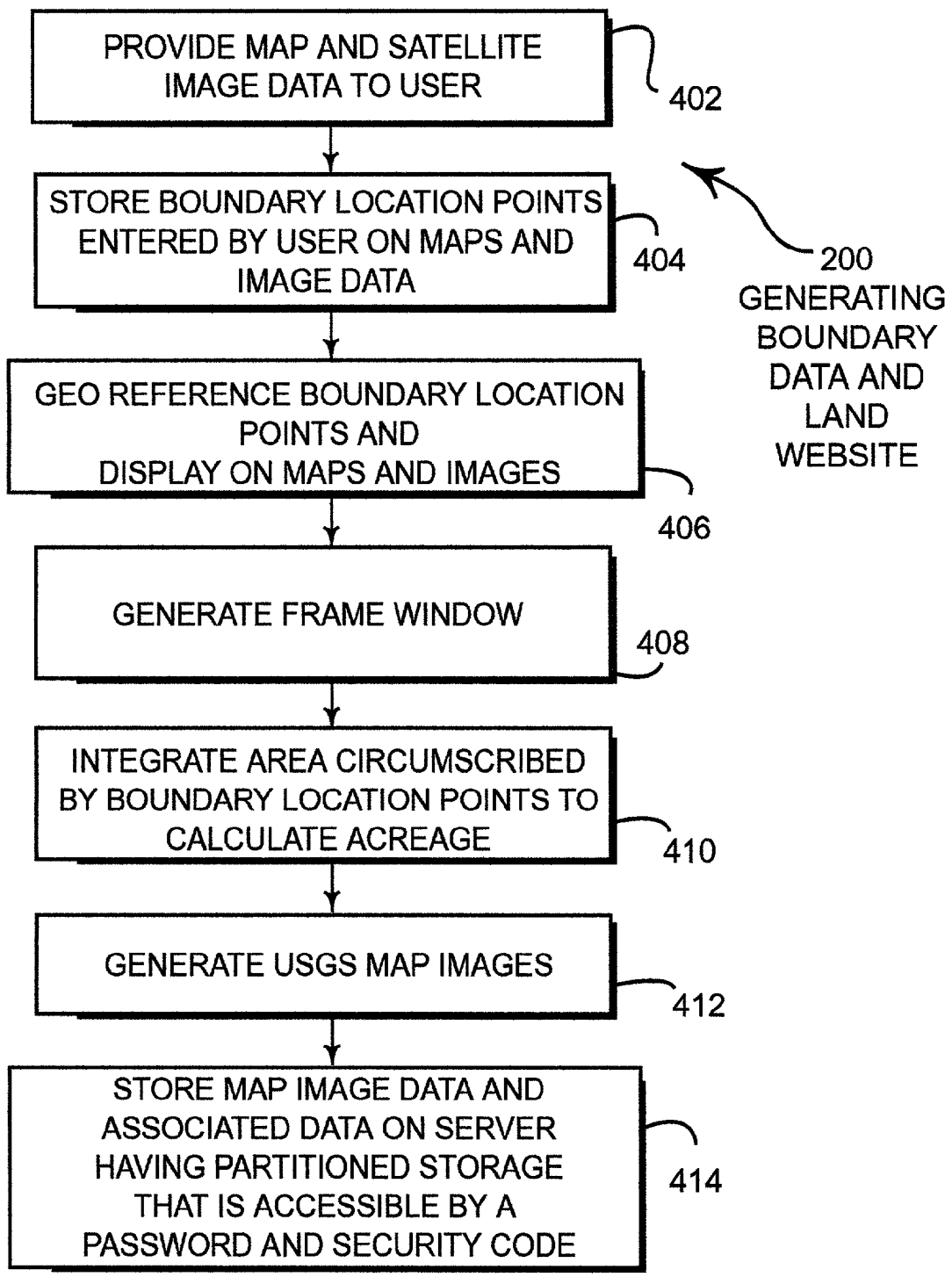
FIG. 4 is a flow chart illustrating the manner of generating boundary data to create a land website.

FIG. 4 illustrates the steps 400 that are used to generate boundary data and a land website. At step 402, various map and satellite image data are provided to the user so that the user can identify boundary location points to generate the boundary data. For example, a series of maps such as 1:24 K USGS, 1:100 K USGS, BLM and other types of maps may be provided so that the user can identify location boundary points. Further, satellite image data that includes vegetation and topological features are provided to assist the user in identifying boundary location points. For example, the user may employ a cursor to click on a boundary location point on a particular map or satellite image. Alternatively, the user may actually hold the cursor down and draw a line indicating a boundary location. At step 404, the boundary location points and other boundary data are entered on the maps and the image data, as indicated above. At step 406, the boundary location points are georeferenced to a global coordinate system. For example, a system of global coordinates can be used to identify the specific location of the boundary location points. Once the global coordinates of each of the boundary location points are determined, the boundary location points are then generated on the other map and image data, as indicated more specifically in FIG. 5.

At step 408 of FIG. 4, once the boundary data has been entered and a complete boundary has been provided, a frame window is generated. The frame window is generated to encompass the entire circumscribed property as well as a certain amount of additional land around the circumscribed property to allow the viewer to view the circumscribed property together with a certain amount of surrounding property. The manner of generating a frame window is more fully disclosed with respect to FIG. 6. At step 410, the system then calculates the acreage of the circumscribed property and provides that information to the user. At step 412, USGS map images, such as the 1:24 K USGS map image or the 1:100 K USGS map image, are generated. These images may be generated, for example, as a jpeg image that can be easily stored and viewed by most personal computers. At step 414, the map image is stored together with any other associated data on the land web server in a partitioned storage that is only accessible by a password and security code. In this fashion, a personalized land website is provided by the land web server for the user so that the user can access the land data. Alternatively, as set forth in FIG. 3, the map image data may not be stored but only used to generate a free map. In that case, the process would stop at step 412.

Figure 5:
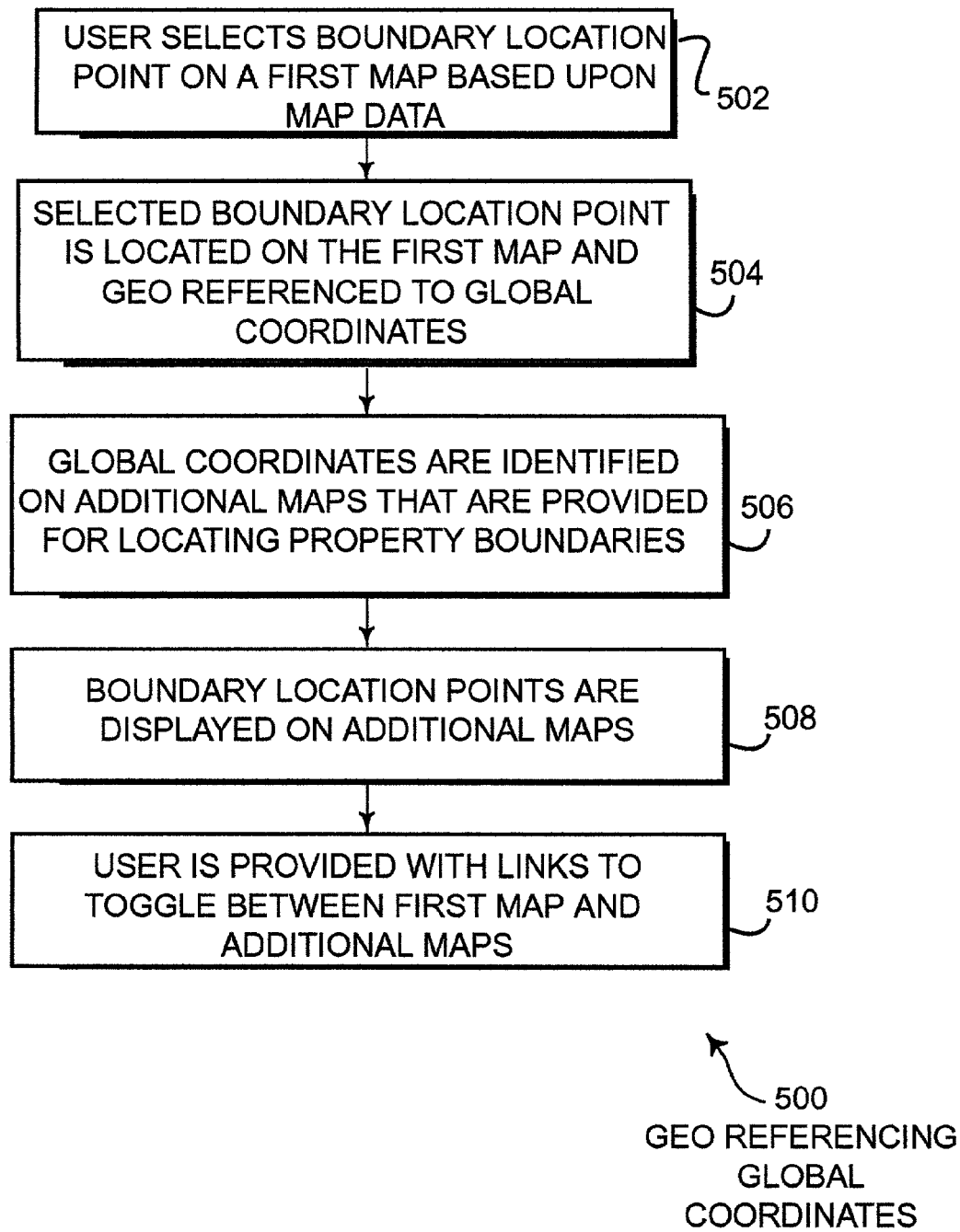
FIG. 5 is a flow chart illustrating the method of georeferencing global coordinates.

FIG. 5 is a flow diagram 500 illustrating the method of georeferencing global coordinates. At step 502, the user selects a boundary location point on a first map based upon the map data. As indicated above, the map data that is provided may be a 1:24 K or 1:100 K USGS map depending on the size of the property. Additionally, other map and image data, as indicated above, may be provided to locate boundary points for the purpose of drawing the boundary locations. At step 504, a selected boundary location point is located on a first map. The boundary location point is then georeferenced to global coordinates. For example, a global coordinate system can be used to georeference the boundary location points that have been selected by the user on the first map. At step 506, the global coordinates are then identified on the additional map and image data, such as satellite image data. The actual location points are displayed on each of the maps and image data in accordance with their georeferenced global coordinates at step 508. At step 510, the user is then provided with links to toggle between the first map and additional maps to insure that the boundary location points have been properly placed on the maps. Changes can be made on any of the maps. If a boundary location point is changed on a particular map, the corresponding location will appear on all of the other maps.

Figure 6:
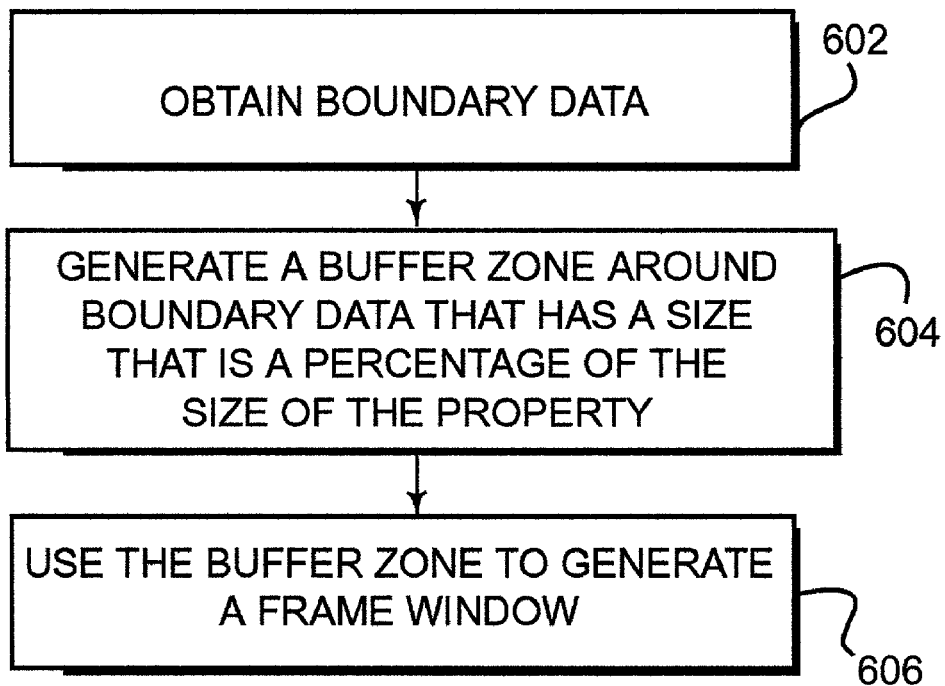
FIG. 6 is a flow diagram illustrating the generation of frame windows.

FIG. 6 illustrates the steps 600 for generating frame windows. At step 602, the boundary data that circumscribes the property of interest is obtained by the frame window software. At step 604, the frame window software generates a buffer zone around the boundary data that normally has a predetermined shape such as a rectangle. The buffer zone has a size that is a certain percentage larger than the size of the circumscribed property so that a certain amount of surrounding land will be displayed in the images that are generated of the property of interest. The decisions regarding how to draw the frame window can operate in accordance with any desired algorithm. For example, if the width of the property of interest has a predetermined distance X, the distance from the outer most part of the property boundary to the frame window on either side may be selected as X/5, for example. The same process can be used in the vertical direction, i.e. the north and south direction, also. Again, any desired manner of selecting the size of a frame window can be used so that the frame window is automatically generated in a way that shows a certain percentage of surrounding property. At step 606, the buffer zone information is used to generate the frame window.

Figure 7:
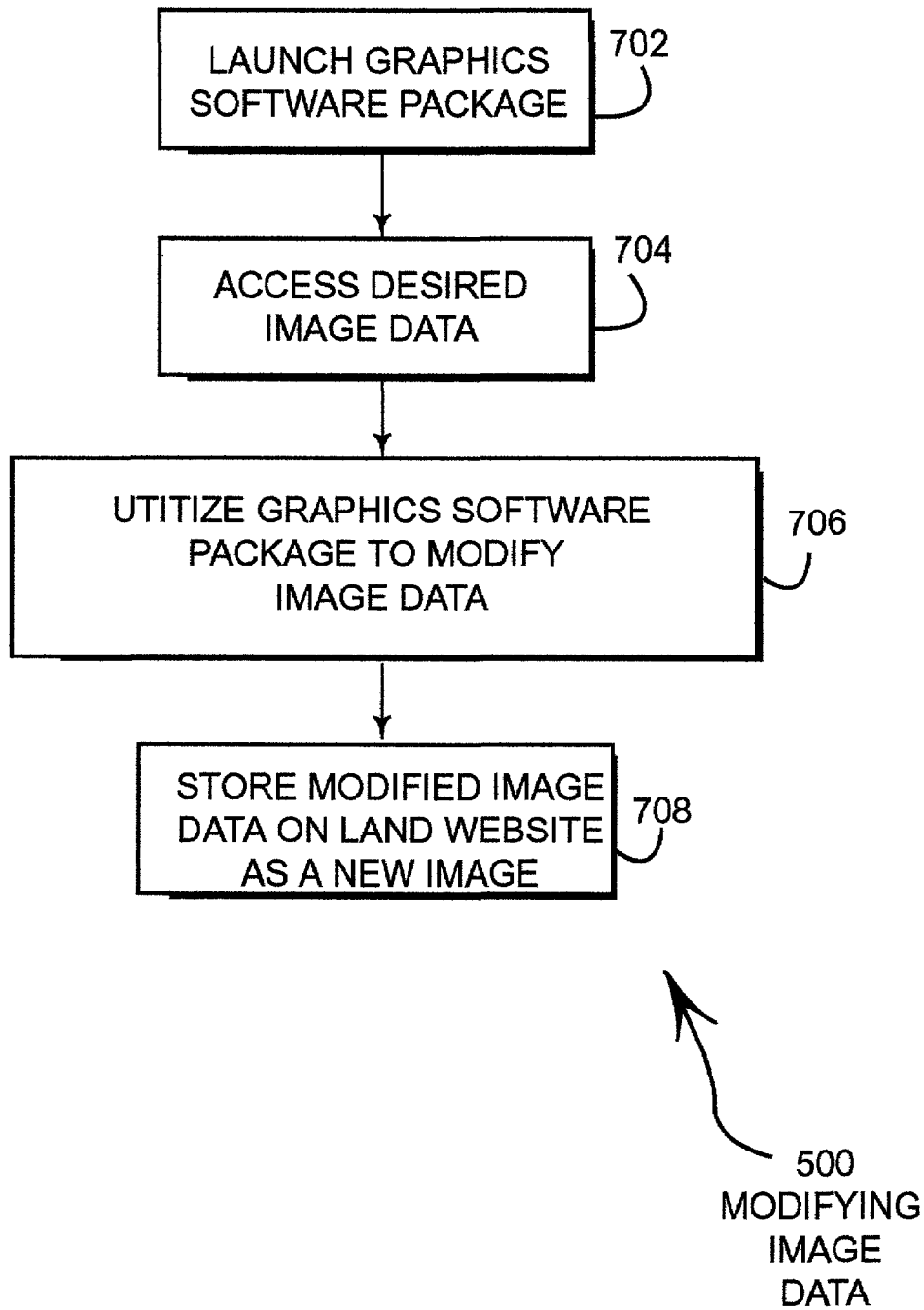
FIG. 7 is a flow diagram illustrating the manner in which image data can be modified.

FIG. 7 illustrates the steps 700 that may be used in modifying image data. At step 502, any standard graphic software package can be launched by the user. Such graphic software packages may comprise Microsoft's PhotoShop, FotoAlbum available from FotoTime, or any other type of graphics package that is capable of displaying and modifying image data, such as jpeg image data. At step 704, the user accesses the desired image data using the graphic software package. For example, the user may wish to access and modify satellite image data or a USGS map to add or take out features. At step 706, the user employs a graphic software package to make modifications to the image data as desired. The graphic software package provides the ability to add or subtract features from the jpeg image. The image can then be stored as indicated at step 708 as a modified image on the land website or as a brand new image.

Figure 8:
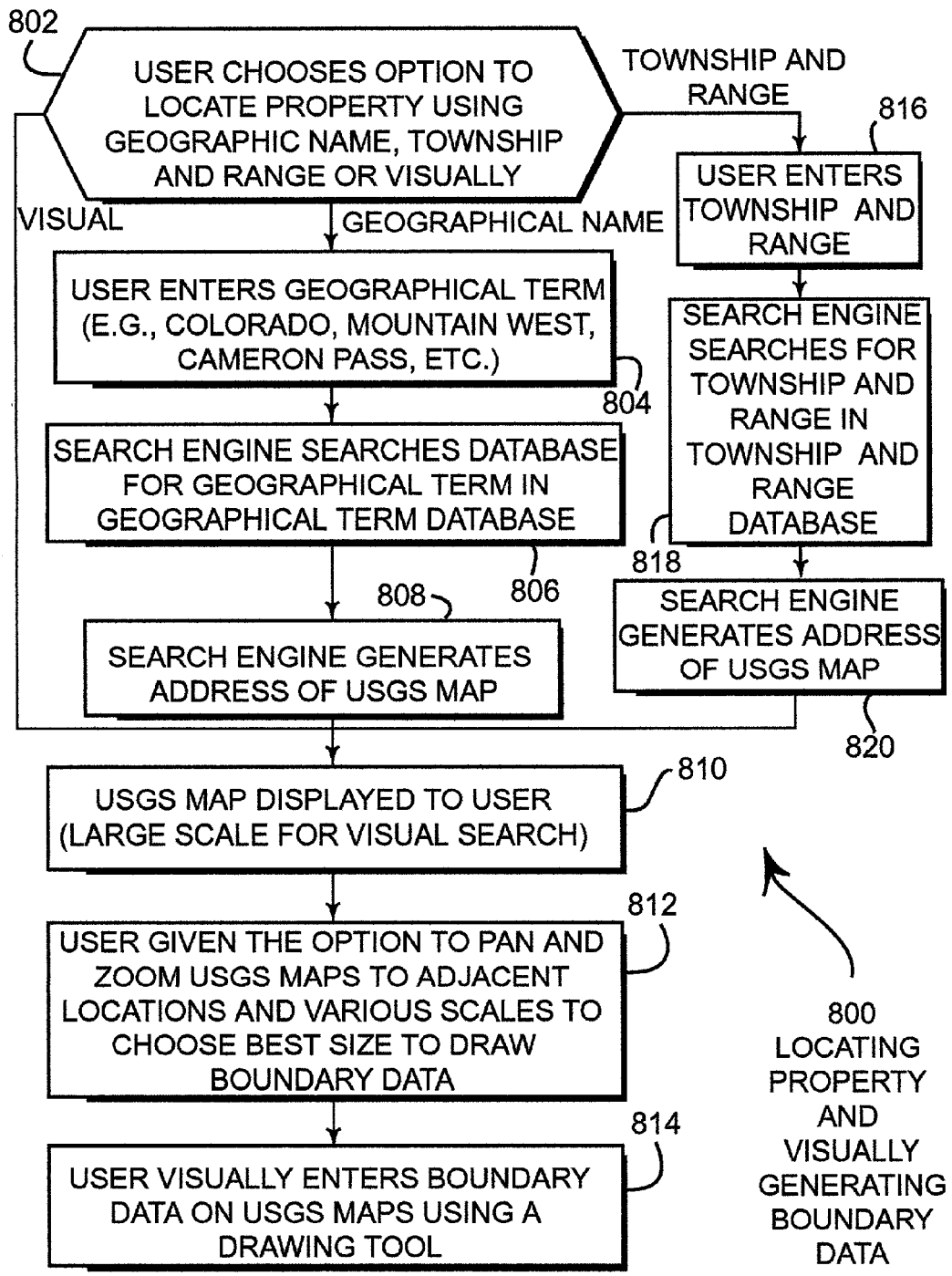
FIG. 8 is a flow diagram illustrating the steps that may be used for locating property and visually generating boundary data.

FIG. 8 is a flow diagram illustrating the steps 800 for locating property and visually generating boundary data. As shown in step 802, a user can choose the option of locating a property using a geographical name, a township or range, or visually locating the property using map data. If a geographical name is used, the process proceeds to step 804 where the user enters the geographical term. The geographical term can be a term such as the name of a state such as Colorado, a region such as Mountain West, a more specific geographical region such as Cameron Pass or Rawah Mountains, etc. There are approximately 1.6 million geographical names that are included in the GENIS (Geographical Name Information System) database that correspond to the USGS quad maps. By entering one of the geographical names from the GENIS database, a USGS quad map can be quickly accessed. At step 806, a search engine is employed that searches a database of geographical terms. The geographical terms are tied to a series of maps such as USGS maps so that the property USGS map can be located. Of course, any type of maps, such as BLM maps or other maps can be tied to the geographical term database. At step 808, the search engine generates an address for the USGS map or other map for the associated geographical term. At step 810, the USGS map or other map is displayed to the user that corresponds to the geographical term that has been used. At step 812, the user is given the option to pan and zoom the USGS maps or other maps to adjacent locations in various scales to choose the best size to draw boundary data. For example, the user may wish to use a 12 K map that shows more detail for smaller pieces of property rather than a 24 K USGS map since the 12 K maps show more detail. Additionally, since the points on each of the maps are georeferenced, smaller scale maps may be more desirable for carefully identifying boundary location points. The USGS maps or other maps can be joined together in a mosaic so that the user can pan from one location to another to locate the desired locations for drawing the boundary data. At step 814, the user visually enters the boundary data on the USGS maps using a drawing tool as described herein.

As shown in FIG. 8, the user may choose to enter a township and range to locate the property of interest at step 802. In this case, the process proceeds to step 816 where the user enters the township and range information. At step 818, a search engine searches for the township and range data in a township and range database. The township and range database is similar to the geographical term database in that it includes a large listing of township and range information which is tied to a series of maps such as USGS maps. Each township and range encompasses an area approximately 6 miles by 6 miles. Hence, a USGS map can be displayed that encompasses an area of approximately that size. Again, any type of map can be used. USGS maps are mentioned only for illustrative purposes. At step 820, the search engine generates an address for the USGS map. The process then proceeds to step 810 where the USGS map is displayed and proceeds through steps 812 and 814 as described above.

As further shown in FIG. 8, the user, at step 802, may choose to visually locate the property of interest. In this case, the process proceeds from step 802 directly to step 810 where a large-scale map is used to visually search. For example, a 1 million or 2 million scale map may be displayed which may show a large portion of a particular state. The user can then proceed through steps 812 and 814 to locate the property of interest. The zooming feature of the present invention simply switch scales of available maps and use processes for identifying the central portion of the particular map that is being displayed and aligning the central portion with a location on a map of a different scale with the central portions aligned. Alternatively, points can be located and clicked. Whenever the zoom-in or zoom-out button has been activated, the maps will change scale and locate the identified point in the central portion of the display.

The various ways of locating property, as illustrated in FIG. 8, can be very useful, especially when performing research on a particular area. For example, studying watersheds can be of particular interest since the watershed can be easily located using the methods described in FIG. 8, and a boundary area can be circumscribed around the area of interest. Further, the Forest Service or others may wish to locate an area and circumscribe that area for the purposes of studying and performing a controlled burn. Further, forestation and cutting of particular areas can be studied with a high degree of accuracy, especially in combination with actual satellite and vegetation images of the area of interest.

Figure 9:
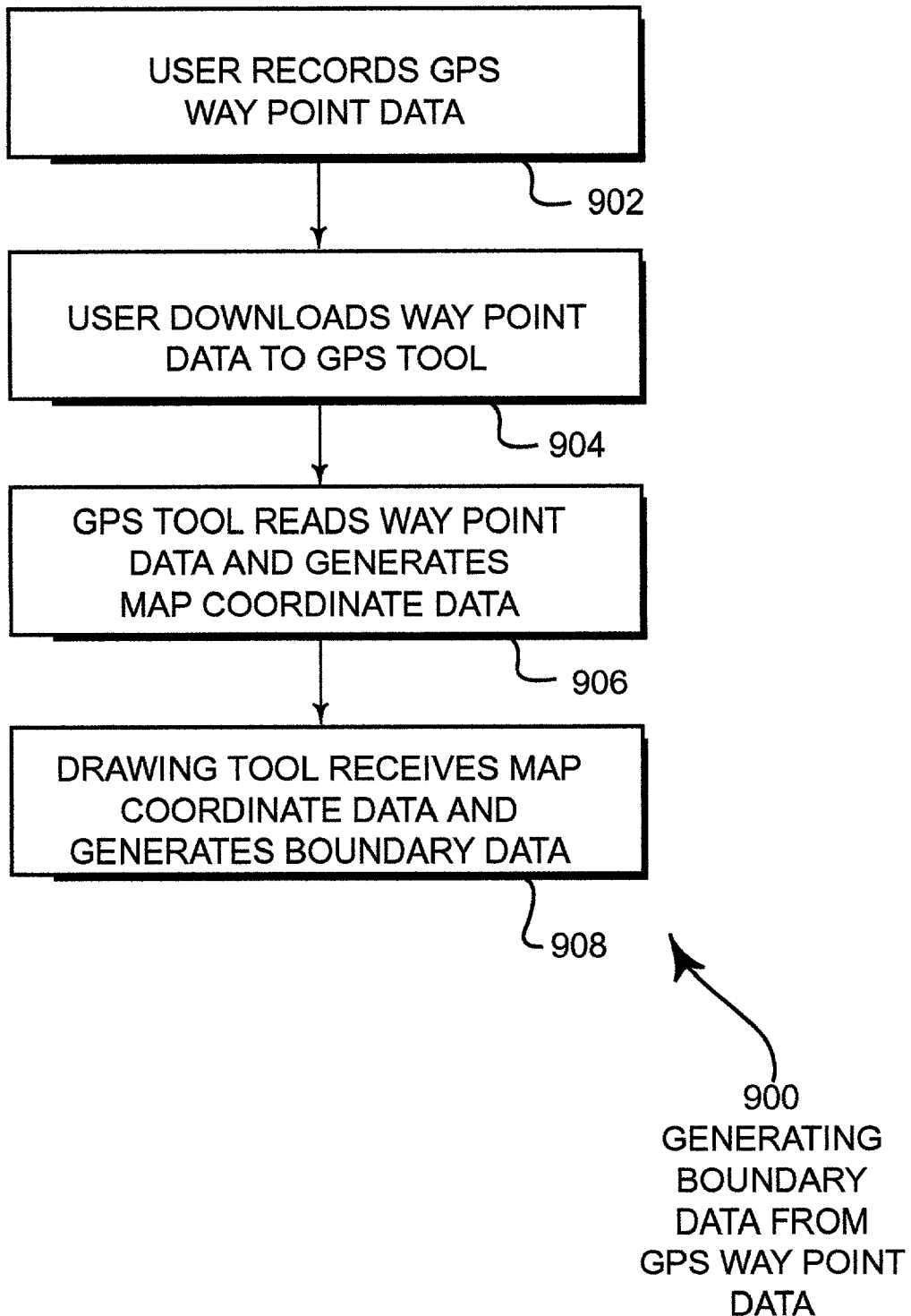
FIG. 9 is a flow chart illustrating the steps that may be used for generating boundary data from GPS way point data.

FIG. 9 is a flow diagram illustrating the steps 900 for generating boundary data from GPS way point data. In accordance with FIG. 9, a user may record GPS way point data by actually visiting the property. For example, a user may be a landowner who is visiting the property and has a portable handheld GPS device capable of recording way points. The user can record the way point data in accordance with a physical tour of the property to insure that the boundary locations are properly located. Similarly, Forest Service personnel may use a handheld GPS device to record way points for an area of interest for a particular study. Similarly, research personnel may wish to review a watershed area to make studies. In each of these cases, the individuals can record way points according to the actual physical locations of the user on the property. At step 904, the user can then download the way point data to a GPS tool. For example, handheld GPS devices can be interconnected to computer systems to allow the GPS way point data to be downloaded into the computer system. At step 906, the GPS tool then reads the way point data and generates map coordinate data. A translator program can be used to translate the GPS coordinate data to the USGS global coordinate system to locate the GPS way points on the USGS maps, for example. The map coordinate data can then be used by a drawing tool at step 908 to generate the boundary data that is used in accordance with the present invention.

Figure 10:
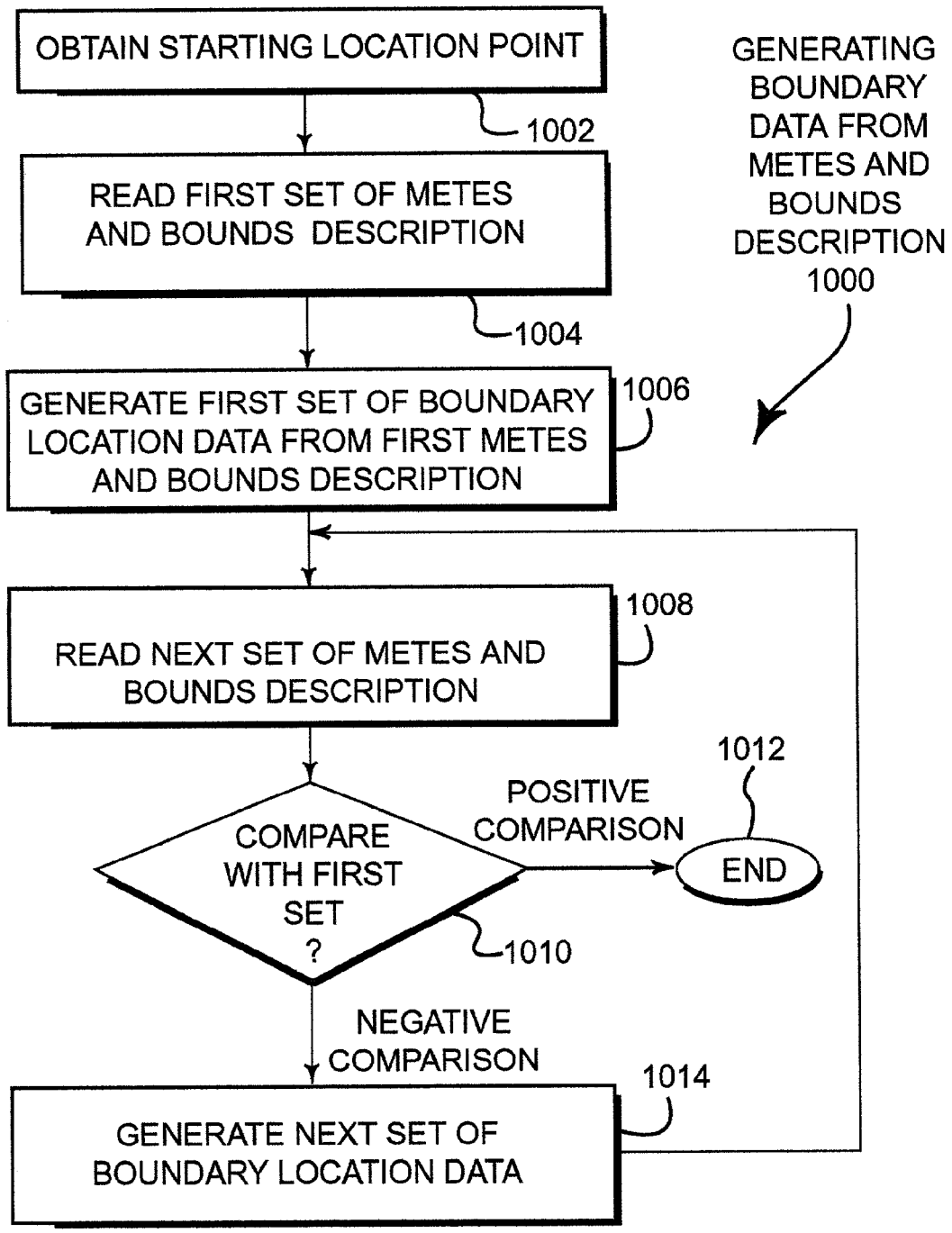
FIG. 10 is a flow diagram illustrating the steps for generating boundary data from metes and bounds descriptions.

FIG. 10 is a flow diagram illustrating the steps 1000 for generating boundary data from metes and bounds descriptions. At step 1002, a starting location point is determined for the metes and bounds descriptions. This starting location point may be visually generated by a user on a USGS map or generated using a GPS way point, for example. Any desired method of generating a starting point can be used at step 1002. At step 1004, a metes and bounds tool reads the first step of metes and bounds description. The metes and bounds descriptions are generally given as vectors such as "proceed North Northwest for 475 feet." Each of these metes and bounds descriptions can be entered into the system as separate vectors. Alternatively, this information can be read by the metes and bounds tool using character recognition techniques and separated using an indicator such as a semicolon for each vector description.

At step 1006, the metes and bounds tool generates a first set of boundary location data from the metes and bounds description. This is done by mathematically plotting each of the vectors onto the map data such as USGS maps to determine boundary location points. At step 1008, the next set of metes and bounds descriptions, i.e. the next metes and bounds vector, is read by the metes and bounds tool. At step 1010, a comparison is made to determine if the most recently read vector corresponds to the first vector. If it does, that indicates that all of the metes and bounds descriptions have been entered, and the process is ended. If it does not, the next set of boundary location data is generated at step 1014. The process then proceeds back to step 1008 until all of the metes and bounds descriptions have been read by the metes and bounds tool.

Figure 11:
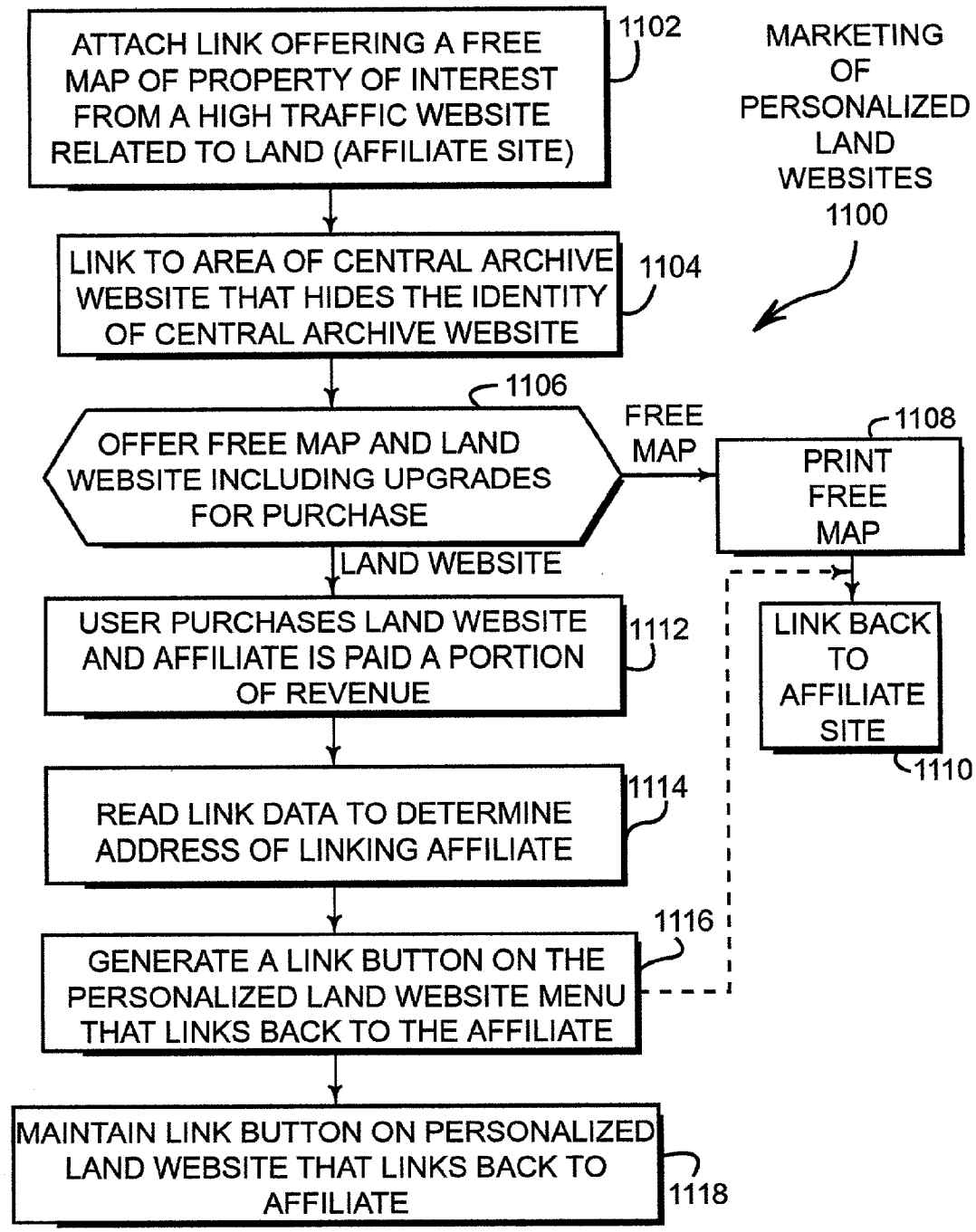
FIG. 11 is a flow diagram illustrating the steps that can be used to market personalized land websites.

FIG. 11 is a flow diagram illustrating the steps 1100 that may be used in marketing personalized land websites. At step 1102, an affiliate is identified that has a high traffic website related to land. An agreement is entered into with the affiliate to attach a link from the affiliate's website offering a free map of land in accordance with step 1102. At step 1104, a link to an area of the central archive land website 102 (FIG. 1) is made that hides the identity of the central archive website. Since the identity of the central archive website of the present invention is kept hidden, the affiliate land website appears to be offering a free valuable service, i.e. a free map of land. In other words, the link button that appears on the affiliate's site that links to an area in the central archive land website that does not identify the central archive land website. In this fashion, it appears that the affiliate is offering the free map of the land. At step 1106, the user is then offered the option of obtaining the free map of the land or purchasing a land website including upgrades as disclosed elsewhere herein. If the user chooses a free map, the process proceeds to a step 1108 where a print of the free map is provided. At step 1110, the user is then linked back to the affiliate's site so that the affiliate has not lost this traffic. If the affiliate chooses to purchase a land website at step 1106, the process proceeds to a step 1112 where the user purchases the land website. At step 1114, the system reads the link data to determine the address of the linking affiliate. In other words, the central archive land website server 102 (FIG. 1) determines the address of the website from where the user has been linked. At step 1116, the central land website server automatically generates the land website for the user which includes a number of menu items. One of the menu items is a link button that links back to the affiliate's site. For example, if the affiliate's site is a lender that specializes in lending money for purchase of ranches, a link button will be provided directly back to that lender. At step 1118, the link button is maintained on the personalized land website that links back to the affiliate for as long as the website remains active. After the land website is generated, the user may be linked directly back to the affiliate's site as shown at step 1110.

The process disclosed in FIG. 11, in this manner, allows the affiliate to offer a valuable free service to the users of the affiliate's site by offering the free map while still having these users linked back to the affiliate's site. In addition, if a user purchases a land website, the affiliate obtains a portion of the revenue of the land website by an agreement between the affiliate and the central land website owner. Further, a link is maintained, that cannot be removed by the user, on the personalized land website back to the affiliate for the entire time that the website is active. By using such a marketing scheme, agreements with affiliates can be easily established.

Figure 12:
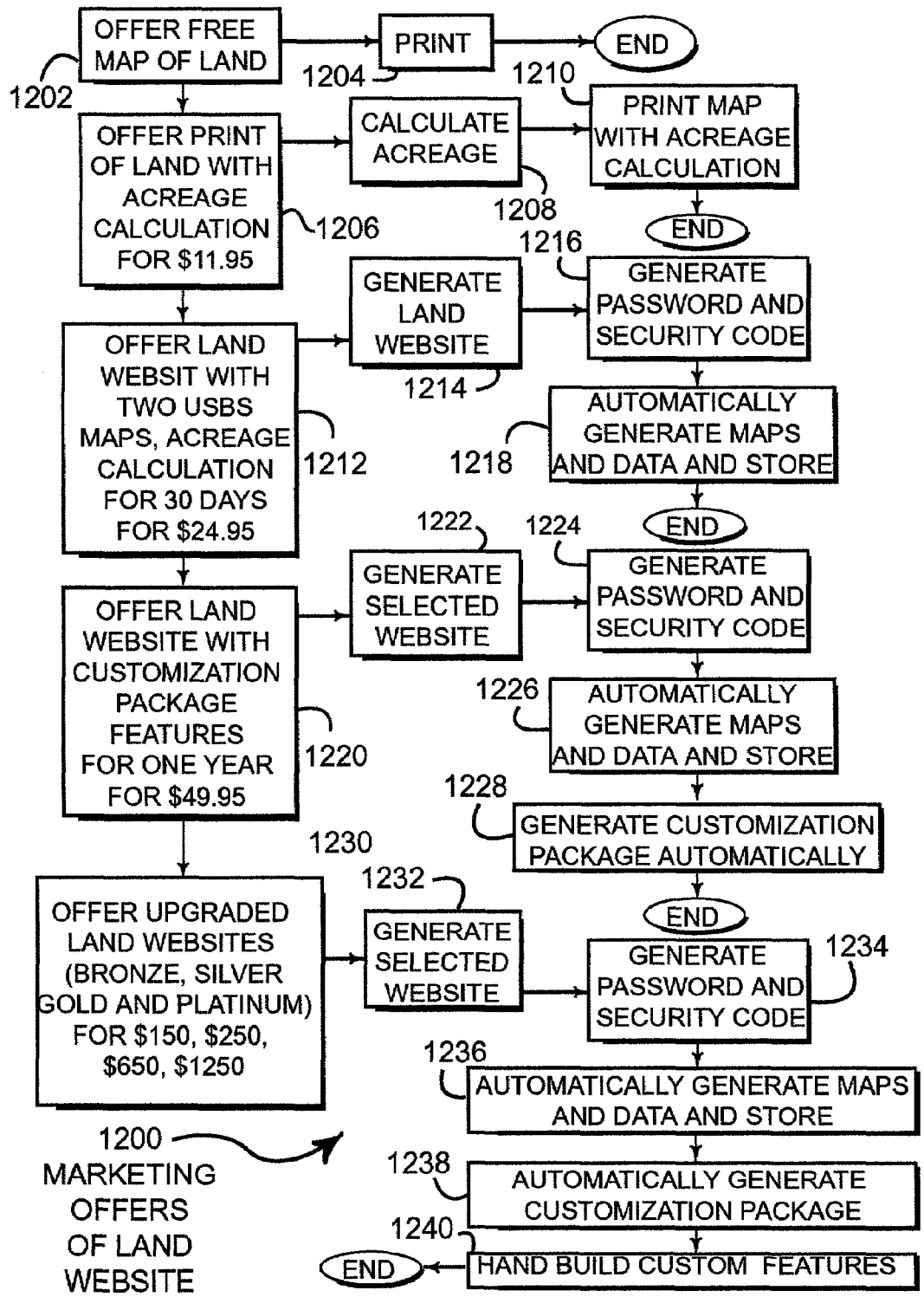
FIG. 12 illustrates the steps that may be employed in the marketing of various offers for products and services.

FIG. 12 is a flow diagram illustrating the steps 1200 in marketing offers of land websites and land website services. FIG. 12 graphically illustrates the manner in which various upgraded services and products can be provided to users at progressively higher prices. Each of the prices illustrated in FIG. 12 is for illustrative purposes only and are provided to indicate the types and services of products that may be available at various illustrative prices. At step 1202, a user is initially offered a free map of the land. If the user chooses the free map, the map is printed for free at step 1204 and the process ends. At step 1206, the user is offered a print of the land together with an acreage calculation for an exemplary price of $11.95. If the user chooses this option, the acreage of the circumscribed property is calculated at step 1208, and a map is printed with the acreage calculation at step 1210. The process is then ended. At step 1212, the user may be offered a land website with two USGS maps and an acreage calculation for a period of 30 days, for example, for an exemplary price of $24.95. If the user selects this option, a land website is generated at step 1214. At step 1216, a password and security code are generated for the user which allows the user to access the land website. At step 1218, maps and data are automatically generated and stored. The process is then ended. At step 1220, the user may be offered a land website with a customization package for a period of one year for a price of $49.95, for example. The system then generates a land website at step 1222, and a password and security code are generated at step 1224. At step 1226, maps and data are automatically generated and stored. At step 1228, a customization package is automatically generated, and the process ends. The customization package can then be used by the user for generating various features of the land website that are described herein. At step 1230, the user may be offered an upgraded land website such as a bronze, silver, gold or platinum level website for exemplary prices of $150.00, $250.00, $650.00 or $1250.00, for example. At step 1232, the selected type of land website is generated. At step 1234, a password and security code are generated. At step 1236, maps and data are automatically generated and stored. At step 1238, a customization package is automatically generated, as described herein. At step 1240, custom features may be hand built into the system such as fly-around movies, 3-D satellite imagery and other custom features.

The present invention therefore provides a unique system for providing individualized land websites that allow data and images regarding a particular piece of property to be collected in a single, easily accessible location. By gathering information in a single location, the time required to purchase or sell property can be accelerated since the information is easily and readily available to everyone involved in the process of a sales transaction including brokers, lenders, appraisers and owners. The land website can also be used to store this important information after the sale and provide an ongoing historical record of the property that includes actual images and condition of the property. The land website can be used for planning and development purposes, such as deciding the best way to subdivide a property, meet environmental regulations, provide crop and/or livestock management, plan development of the property such as introduction of canals or ponds, forestation and cutting of forests, as well as various other purposes. The land website can be accessed by anyone having the password and security code, such as government officials making decisions relating to the property. Further, the land website allows users to e-mail images of the property if the user does not wish a particular individual to have full access to the personalized land website. Further, since the map data and image data is presented in an image format, standard graphics packages can be used to modify the images and easily indicate any desired features for planning purposes, or any other informational purposes.

The present invention utilizes simple web browsers that are available on most personal computers to access and view the images of the property and also uses standard graphics packages to make modifications. Hence, the land website is intuitive and easy to use. Easily accessible image format data can be provided in a secure manner to users. The land website of the present invention provides a useful and unique tool for utilizing both satellite image data and map image data, as well as other associated data relating to a piece of property, in a simple and easy fashion. Further, boundary information can be easily generated by either selecting a global coordinate location such as a township and range, or by simply accessing a location on a map and enlarging the view to an appropriate size so that boundaries can be drawn using a simple and easy-to-use boundary applet tool. Further, the present invention is also capable of providing unique 3-D images and 3-D fly-around movies of the property so that a virtual tour can be taken of the property. The virtual tour images can be created using composites of various satellite image data as well as map image data to provide a very complete and authentic view of the property. For example, infrared vegetation imaging can be combined with regular visual image data from satellites to provide a very realistic view of the property. Further, USGS map data or BLM map data may be included in the image to show legal boundaries and various features of the property. In this way, individuals, such as lenders and appraisers, can view the property in a very realistic fashion without actually taking the time to visit the property. In this manner, valuable time and effort can be saved by using the land website of the present invention.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of generating a personalized land website at a dedicated Internet accessible location having a dedicated uniform resource locator (URL) address on the Internet, said personalized land website providing an archive of a variety of information relating to a selected area of land comprising:

creating said dedicated Internet accessible location at said dedicated URL address for storage of said archive of said variety of information;

providing map image data over the Internet that relates to said selected area of land;

providing boundary drawing tools to allow a boundary to be circumscribed at least partially around said selected area of land on said map image data;

drawing a boundary at least partially around said selected area of land using said boundary drawing;

providing additional map image data from different types of maps and photographic image data located within and around said boundary to assist circumscribing said boundary;

storing said map image data, additional map image data and said photographic image data at said dedicated Internet accessible location on said land website at said URL address, said dedicated Internet accessible address being accessible to users of said personalized land website;

providing additional storage locations on said personalized land website that are accessible to said users to allow storage of text information relating to legal descriptions and other information pertaining to said area of land at said dedicated Internet accessible location.

2. The method of claim 1 further comprising:

providing further storage locations on said personalized land website that are accessible to said users to allow said creator to store photographic data relating to said area of land.

3. The method of claim 1 further comprising:

providing toggling tools that allow said users to rapidly access said additional map image data and other image data located within and around said boundary.

4. The method of claim 1 further comprising:

automatically generating said boundary on said additional map image data and said other image data;

displaying said boundary with said additional map image data and said other image data.

5. The method of claim 1 further comprising:

providing imaging tools to allow said map image data, additional map image data and other image data to be modified.

6. The method of claim 5 wherein said step of providing imaging tools further comprises:

providing imaging tools that allow features to be added or removed from said image data;

providing imaging tools that allow said image data to be combined.

7. The method of claim 1 wherein said step of providing additional storage locations further comprises providing additional storage locations on said land website that are accessible to said users to allow storage of legal documents relating to said area of land.

8. The method of claim 1 wherein said step of providing map image data comprises providing USGS map image data.

9. The method of claim 1 wherein said step of generating additional map image data comprises generating BLM maps.

10. The method of claim 1 wherein said step of generating additional map image data comprises generating 2.5 D map image data.

11. The method of claim 1 wherein said step of generating photographic image data comprises generating satellite image data.

12. The method of claim 1 wherein said step of generating other image data comprises generating aerial image data.

13. The method of claim 1 wherein said step of generating other image data comprises generating 3D satellite image data.

14. The method of claim 1 wherein the storage of text information may be e-documents such as tide abstracts, deed information, legal descriptions, leases, rights-of-way, surveys, watershed studies, easements, loan information, appraisal reports, grazing leases, insurance, conservation easements, ownership rights, public land leases, mineral rights of land, water rights of land, land titles, environmental audit, third party maps, insurance documents, improvements, leases, flood plain data, scanned documents, loan documents, right of way information, or e-appraisal reports.

15. A method of generating a personalized land website at a dedicated Internet accessible location having a dedicated uniform resource locator address (URL) address on the Internet, said personalized land website dedicated to providing a variety of different types of information relating to a selected area of land at said dedicated URL address that is accessible to users of the Internet comprising:

creating said dedicated Internet accessible location for said land website that is accessible by users of the Internet at said dedicated URL address for storage of said variety of information relating to said selected area of land;

providing map image data over the Internet that is stored at said dedicated Internet accessible location;

drawing a boundary at least partially around said selected area of land using a boundary drawing tool;

automatically generating a frame window around said boundary that includes said selected area of land and surrounding areas that fit within a display window;

providing additional map image data that includes different types of maps and other image data that includes photographic data relating to said land located within said frame window to assist in drawing said boundary; and storing said map image data, additional map image data and other image data on said personalized land website at said dedicated Internet accessible location which is located at said dedicated URL address.

16. The method of claim 15 further comprising:

protecting said storage areas by providing separate security codes for said storage area, and limiting access to said storage areas by controlling distribution of said security codes.

17. The method of claim 16 further comprising:

providing additional storage areas for storing textual information relating to said area of land.

18. The method of claim 15 wherein said photographic data includes satellite image data relating to said area of land.

19. The method of claim 17 further comprising:

providing image modification tools to allow modification of said map image data, additional map image data and other image data.

20. The method of claim 18 wherein said photographic data includes satellite image data that allows an elevated 360 degree fly-around view of the subject land showing topological features and boundaries of the land.

21. The method of claim 20 wherein said photographic data includes satellite image data that allows land virtual tour components.

22. A land website that allows a creator to generate a personalized land website, said personalized land website providing a dedicated Internet accessible location for archiving information relating to an area of land comprising:

a storage device that stores map image data that is accessible to a creator of said personalized land website;

boundary drawing tools that allow said creator to circumscribe as boundary around said area of land using said map image data and said other image data;

a frame window generator that generates a frame window around said area of land by identifying global coordinates on said map image data and other image data that identify map image data and other image data to be stored on said personalized land website;

an Internet accessible storage area on said land website having an Internet address that stores said map image data and other image data as a personalized land website for access by users;

browser compatible imaging tools that interface with browsers utilized by said users to allow said users to view said map image data and other image data.

23. A method of generating individual and personalized land websites accessible to a plurality of website creators creating a dedicated uniform resource locator (URL) address on the Internet for a website creator that provides information relating to a website creator's area of land, said personalized land website providing a dedicated Internet accessible location at said URL address that provides an archive of said information, comprising:

creating a dedicated uniform resource locator (URL) address on the internet for each creator's website that provides information relating to a creator's selected area of land;

providing map image data over the Internet that is accessible to a website creator that desires to generate said land website;

providing boundary drawing tools to said website creator to allow said website creator to circumscribe a boundary around said selected area of land on said map image data to create a personalized land map;

determining global coordinates of said boundary;

storing said personalized map image data in storage locations on the creator's land website at said URL address that are accessible to public users of said creator's land website; and providing additional storage locations on creator's land website that are accessible to said website creators to allow storage of text information relating to legal descriptions and other information pertaining to said personalized land map.

24. The method of claim 23 wherein the storage of text information may be e-documents such as title abstracts, deed information, legal descriptions, leases, rights-of-way, surveys, watershed studies, easements, loan information, appraisal reports, grazing leases, insurance, conservation easements, ownership rights, public land leases, mineral rights of land, water rights of land, land titles, environmental audit, third party maps, insurance documents, improvements, leases, flood plain data, scanned documents, loan documents, right of way information, or e-appraisal reports.

25. A method of generating a personalized land websites for a plurality of website creators creating a dedicated uniform resource locator address (URL) address on the Internet that contains information relating to an area of land at said URL address that is accessible on the Internet comprising:

creating a dedicated uniform resource locator (URL) address on the Internet for each creator's website that provides information relating to a creator's selected area of land;

providing map image data over the Internet that is accessible to a website creator that desires to generate said personalized land websites;

drawing a boundary around said selected area of land using boundary drawing tools to create a personalized land map;

automatically generating a frame window around said boundary that includes said personalized land map and surrounding areas that fit within a display window;

determining global coordinates of said frame window;

storing said personalized land map image data at said personalized land website at said URL address; and protecting said storage areas and additional storage areas with at least one security code for limiting access to said dedicated URL address by public users.

26. The method of claim 25 wherein the storage of text information may be e-documents such as title abstracts, deed information, legal descriptions, leases, rights-of-way, surveys, watershed studies, easements, loan information, appraisal reports, grazing leases, insurance, conservation easements, ownership rights, public land leases, mineral rights of land, water rights of land, land titles, environmental audit, third party maps, insurance documents, improvements, leases, flood plain data, scanned documents, loan documents, right of way information, or e-appraisal reports.

* * * * *